United States Patent
Agrawal et al.

(10) Patent No.: US 10,324,614 B2
(45) Date of Patent: Jun. 18, 2019

(54) SHARING A FILE WITH A SINGLE CONTACT

(71) Applicant: Dropbox, Inc., San Francisco, CA (US)

(72) Inventors: Abhishek Agrawal, San Francisco, CA (US); Rasmus Andersson, San Francisco, CA (US); Nikhil Bhargava, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 701 days.

(21) Appl. No.: 14/880,839

(22) Filed: Oct. 12, 2015

(65) Prior Publication Data

US 2017/0102852 A1   Apr. 13, 2017

(51) Int. Cl.
| | |
|---|---|
| *G06F 3/0481* | (2013.01) |
| *G06F 3/0484* | (2013.01) |
| *G06F 3/0486* | (2013.01) |
| *G06F 17/30* | (2006.01) |
| *H04L 29/08* | (2006.01) |
| *H04L 29/06* | (2006.01) |

(52) U.S. Cl.
CPC ........ *G06F 3/0486* (2013.01); *G06F 3/04817* (2013.01); *G06F 3/04842* (2013.01); *H04L 67/06* (2013.01); *H04L 67/36* (2013.01); *G06F 3/0481* (2013.01); *H04L 65/403* (2013.01)

(58) Field of Classification Search
CPC ............. G06F 3/0481; G06F 17/30165; G06F 3/0486; G06F 3/04817; G06F 3/04842; H04L 65/403; H04L 67/06; H04L 67/36
See application file for complete search history.

(56) References Cited

U.S. PATENT DOCUMENTS

| | | | | |
|---|---|---|---|---|
| 2007/0055926 A1* | 3/2007 | Christiansen | ......... | G06F 17/241 715/210 |
| 2007/0067726 A1* | 3/2007 | Flynt | ................. | G06F 17/30905 715/733 |
| 2009/0276455 A1* | 11/2009 | Yu | ..................... | G06F 17/30011 |
| 2012/0331568 A1* | 12/2012 | Weinstein | ............. | H04L 12/185 726/29 |
| 2013/0080912 A1* | 3/2013 | Job | ........................ | G06F 15/16 715/748 |
| 2014/0047349 A1* | 2/2014 | Kulkarni | ............... | G06F 3/0482 715/739 |
| 2014/0304618 A1* | 10/2014 | Carriero | .............. | H04L 12/1818 715/753 |

* cited by examiner

Primary Examiner — Ting Z Lee (74) Attorney, Agent, or Firm — Keller Jolley Preece (57) ABSTRACT

A content management system rendering a file sharing GUI on a first device which is communicatively coupled to a content management system and associated with a first user having an account with the content management system. A file to be shared with a second user is identified in response to the file being selected and dragged. In response to the file being identified, a contact section displaying contact icons is rendered. The selected file is released on a displayed contact icon and a user identifier, e.g., an email address or account, associated with the displayed contact icon is identified. In response to the user identifier being identified, the selected file is shared with a second user associated with the user identified.

21 Claims, 9 Drawing Sheets

SHARING A FILE WITH A SINGLE CONTACT

TECHNICAL FIELD

The present technology pertains to sharing a file with a single contact, and more specifically pertains to sharing a selected file by dragging the file into a contact section of a file sharing graphical user interface (GUI) to send the file to another user.

BACKGROUND

Conventional online storage systems provide online storage folders for storing files from users. In such systems, a user who wishes to share a file can (a) designate a folder containing the file to be shared as a shared folder and identify one or more people to share the folder with, (b) create a new folder containing the file, designate the folder as a shared folder and identify one or more people to share the folder with, or (c) insert the file into an existing shared folder. To share a file using conventional email systems, a user typically (a) opens a file, enters a send command, enters an email address and then enters a second send command or (b) creates an email message, enters an email address, enters a file attachment command, selects a file and then selects a send command. Regardless of how a user shares a file using conventional systems, the methodology is inefficient. In addition, there is no easy methodology for people to comment on the shared file.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for allowing a first user to share a file with a second user by dragging a selected file into a contact section of a file sharing GUI. The disclosed technology addresses the need in the art for an efficient methodology to share a file in a one-to-one collaboration. In addition, the two users associated with the shared file are able to provide comments associated with the shared file in an efficient manner. For example, the user can select the file, enter a comment and select a button to post the comment. As a result, the comment is associated with the file and rendered on the client devices associated with the file. The file sharing GUI can function in a similar manner as conventional email systems, thereby providing an easy learning curve to use the file sharing GUI.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

In one or more embodiments, a content management system renders a file sharing GUI on a first device which is communicatively coupled to a server of a content management system and being associated with a first user having an account with the content management system. A file to be shared with a second user can be identified in response to the file being selected and dragged. In response to the file being identified, a contact section displaying contact icons is rendered in the file sharing GUI. The selected file is released on a displayed contact icon or released on an email section. In the event, the selected file was released on a displayed contact icon, one or more email addresses and/or accounts associated with the displayed contact icon is identified. In the event the selected file was released on the email section, an email address is identified by the first user entering an email address of a contact to share the selected file with. In response to the email address and/or account being identified, the selected file is shared with a second user associated with the identified email address and/or account. The selected file can be sent to the second user. The first user or second user can select the shared file to read or edit the shared file by selecting an image of the shared file in an image section of the file sharing GUI. The first or second user can comment on the shared file by entering a comment in a comment section and having the comment associated with the shared file and displayed on client devices associated with each of the first user and second user. When a user modifies, reads or comments on the shared file, the other user can be notified.

Figure 1:
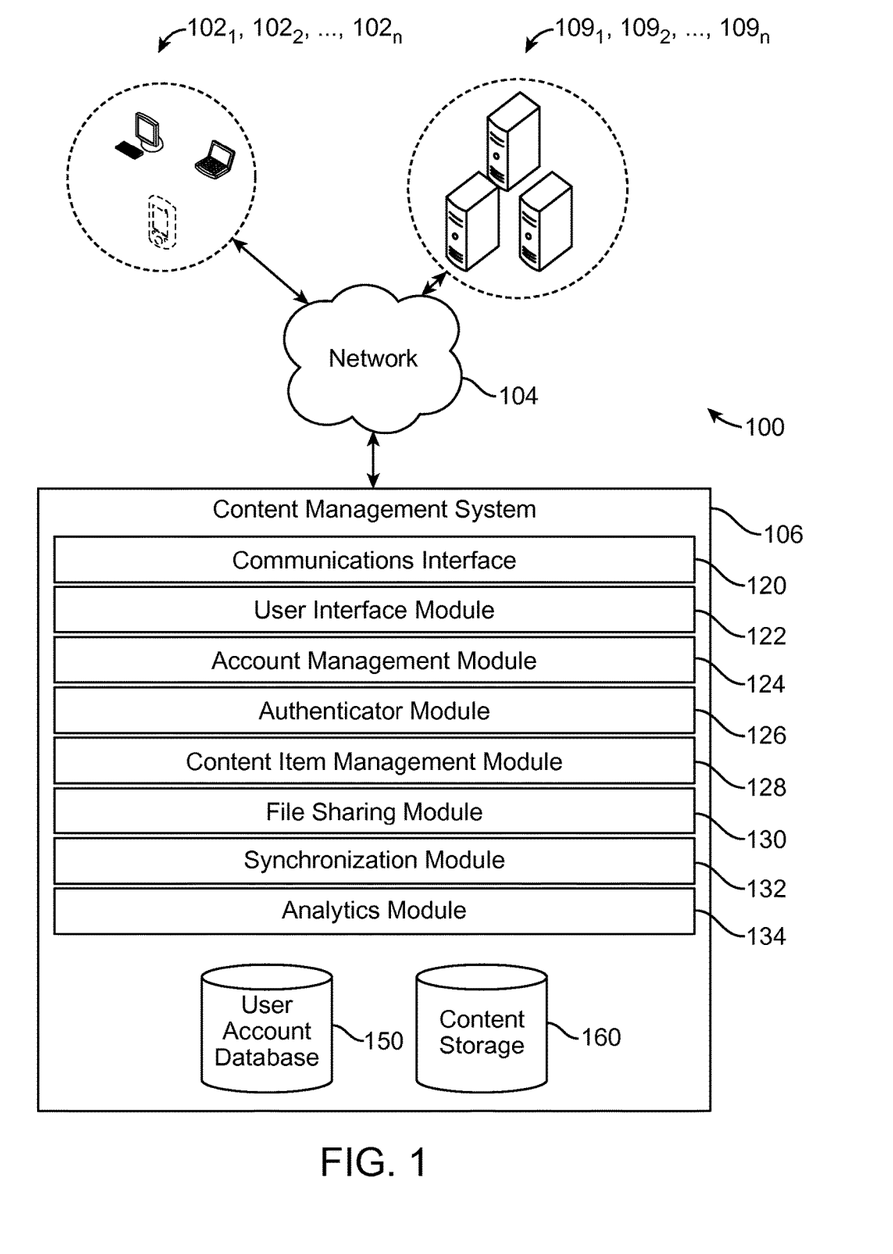
FIG. 1 is a block diagram of a configuration of devices and a network in accordance with an exemplary embodiment.

Referring to FIG. 1, a block diagram of a configuration of devices and a network in accordance with an exemplary embodiment is illustrated. The system 100 allows electronic devices to communicate via a network to share files and comments associated with the shared files in an efficient manner. The system can be configured for use on a wide area network, such as the Internet. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with a content management system 106 through client devices $102_1$, $102_2, \ldots, 102_n$ (collectively "102") communicatively coupled with a network 104 by direct and/or indirect communication. Content management system 106 can support connections from a variety of different client devices, such as desktop computers; mobile computers; mobile communications devices, e.g., mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with the content management system 106 via a client-side application installed on a client device $102_i$. In some embodiments, the client-side application can include a content management system 106 specific component. For example, the component can be a stand-alone application, one or more application plug-ins, and/or a browser extension. However, the user can also interact with content management system 106 via a third-party application, such as a web browser, that resides on a client device $102_i$ and is configured to communicate with content management system 106. In either case, the client-side application can present a file sharing GUI for the user to interact with content management system 106 to share files and any associated comments. More specifically, the client-side application can allow a first user having an account with the content management system 106 to share a file in a one-to-one collaboration with a second user. The second user preferably has an account with the content management system 106, but does not need to.

Content management system 106 can make it possible for a user to store files, as well as perform a variety of content management tasks, such as retrieve, modify, browse, comment and/or share the content depending on who the user is as explained below in further detail. Furthermore, content management system 106 can make it possible for a user to access the file from multiple client devices 102. For example, the client device $102_i$ can upload content to content management system 106 via network 104. The content can later be retrieved from content management system 106 using the same client device $102_i$ or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information. Content management system 106 can store non-account user, e.g., information in a user account database 150, where the non-account users are associated with a user account.

User account database 150 can also include account management information, such as account type, e.g., free or paid; usage information, e.g., file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106. An account can be used to store content, such as digital data, document files, text files, audio files, video files, etc., from one or more client devices 102 authorized on the account.

The content can also include folders or other mechanisms of grouping content items together with different behaviors, such as playlists, albums, etc. For example, an account can include a public folder that is accessible to any user. The content can be stored in content storage 160. Content storage 160 can be a storage device, multiple storage devices, a server or multiple servers. Alternatively, content storage 160 can be a cloud storage provider or network storage accessible via one or more communications networks. Content management system 106 can hide the complexity and details from client devices 102 so that client devices 102 do not need to know exactly where the shared files are being stored by content management system 106. In one variation, content management system 106 can store the shared files in the same folder hierarchy as they appear on client device $102_i$. However, content management system 106 can store the shared files in its own order, arrangement, or hierarchy. Content management system 106 can store the shared files in a network accessible storage (SAN) device, in a redundant array of inexpensive disks (RAID), etc. Content storage 160 can store shared files using one or more partition types, such as FAT, FAT32, NTFS, EXT2, EXT3, EXT4, ReiserFS, BTRFS, and so forth.

Content storage 160 can also store metadata describing shared files, shared file types and the relationship of shared files to various accounts. The metadata for a shared file can be stored as part of the shared file or can be stored separately. In one variation, each shared file stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store shared files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of one or more shared files from one or more client devices 102. The synchronization can be platform agnostic. That is, the shared files can be synchronized across multiple client devices 102 of varying type, capabilities, operating systems, etc. For example, client device $102_i$ can include client software, which synchronizes, via a synchronization module 132 at content management system 106, the shared files in client device $102_i$'s file system with the shared files in an associated user account. In some cases, the client software can synchronize any changes to one or more shared files in an account, such as new, deleted, modified or commented on. The client software can be a separate software application, can integrate with an existing content management application in the operating system or some combination thereof. In one example of client software that integrates with an existing content management application, a user can manipulate one or more shared files directly in a local folder, while a background process monitors the local folder for changes and synchronizes those changes to content management system 106. Conversely, the background process can identify the one or more shared files that have been updated at content management system 106 and synchronize those changes to the local folder. The client software can provide notifications of synchronization operations, and can provide indications of the shared files statuses directly within the content management application. Sometimes client device 102$_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate one or more shared files via a web interface generated and served by user interface (UI) module 122. For example, the user can navigate in a web browser to a web address provided by content management system 106. Changes or updates to one or more shared files in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers 109$_1$, 109$_2$, . . . , 109$_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, comment, or otherwise manipulate content. Similarly, the API can allow users to access all or part of content storage 160 through a web site.

Content management system 106 can also include an authenticator module 126, which can verify user credentials, security tokens, API calls, specific client devices, and so forth, to ensure only authorized clients and users can access files. Further, content management system 106 can include analytics module 134 that can track and report on aggregate file operations, user actions, network usage, total storage space used, as well as other technology, usage, or business metrics. A privacy and/or security policy can prevent unauthorized access to user data stored with content management system 106.

Content management system 106 can include a file sharing module 130 for managing the collection and storage of files in user accounts. Each shared file can include one or more comments from the two users associated with the shared file. The shared files can be images, photos, pdfs, documents or any other content item. As explained below, a first user can share a file with a second user. The first user can have an account with the content management system 106. The second user can have an account with the content management system 106 or not have an account with the content management system 106. Each user associated with a shared file can retrieve, view, modify, browse, comment and/or share the file.

In some embodiments, content management system 106 can be configured to maintain a content directory identifying the location of each shared file in content storage 160. The content directory can include a unique file entry for each shared file stored in the content storage. A file entry can include a file path that can be used to identify the location of the shared file in a content management system 106. For example, the file path can include the name of the shared file and a folder hierarchy associated with the shared file. For example, the file path can include a folder or path of folders in which the shared file is placed as well as the name of the shared file. Content management system 106 can use the file path to present the shared files in the appropriate folder hierarchy. A shared file can also include a file pointer that identifies the location of the shared file in content storage 160. For example, the file pointer can include the exact storage address of the shared file in memory. In some embodiments, the file pointer can point to multiple locations, each of which contains a portion of the shared file. In addition to a file path and file pointer, a shared file can also include user identifiers that identify the users which have access to the shared file.

The file sharing module 130 can be configured to generate a custom network address, such as a uniform resource locator (URL), which allows any web browser to access the shared file in the content management system 106 without any authentication. To accomplish this, the file sharing module 130 can be configured to include file identification data in the generated URL, which can later be used to properly identify the user and provide access to the shared file. For example, the sharing module 130 can be configured to include the user account identifier and the file path in the generated URL. Upon selection of a shared file, the file identification data included in the URL can be transmitted to the content management system 106 which can use the received file identification data to identify the appropriate location of the shared file and provide access to the shared file.

In addition to generating the URL, the file sharing module 130 can also be configured to record that a URL for a shared file has been created. In some embodiments, the shared file can include a URL flag indicating whether a URL to a file has been created. For example, the URL flag can be a Boolean value initially set to 0 or false to indicate that a URL to the file has not been created. The sharing module 130 can be configured to change the value of the flag to 1 or true after generating a URL to the shared file.

In some embodiments, the sharing module 130 can also be configured to deactivate a generated URL. For example, each collection folder can also include a URL active flag indicating whether the shared file should be returned in response to a request from the generated URL. For example, the sharing module 130 can be configured to only return a shared file requested by a generated link if the URL active flag is set to 1 or true. Thus, access to a shared file for which a URL has been generated can be easily restricted by changing the value of the URL active flag. This allows a file owner to restrict access to the shared files without having to move one or more shared files or delete the generated URL. Likewise, sharing module 130 can reactivate the URL by again changing the value of the URL active flag to 1 or true. A file owner can thus easily restore access to the shared file without the need to generate a new URL. A file owner has access to active shared files and deactivated shared files.

While content management system 106 is presented with specific components, it should be understood by one skilled in the art, that the architectural configuration of system 106 is simply one possible configuration and that other configurations with more or less components are also possible.

Figure 2:
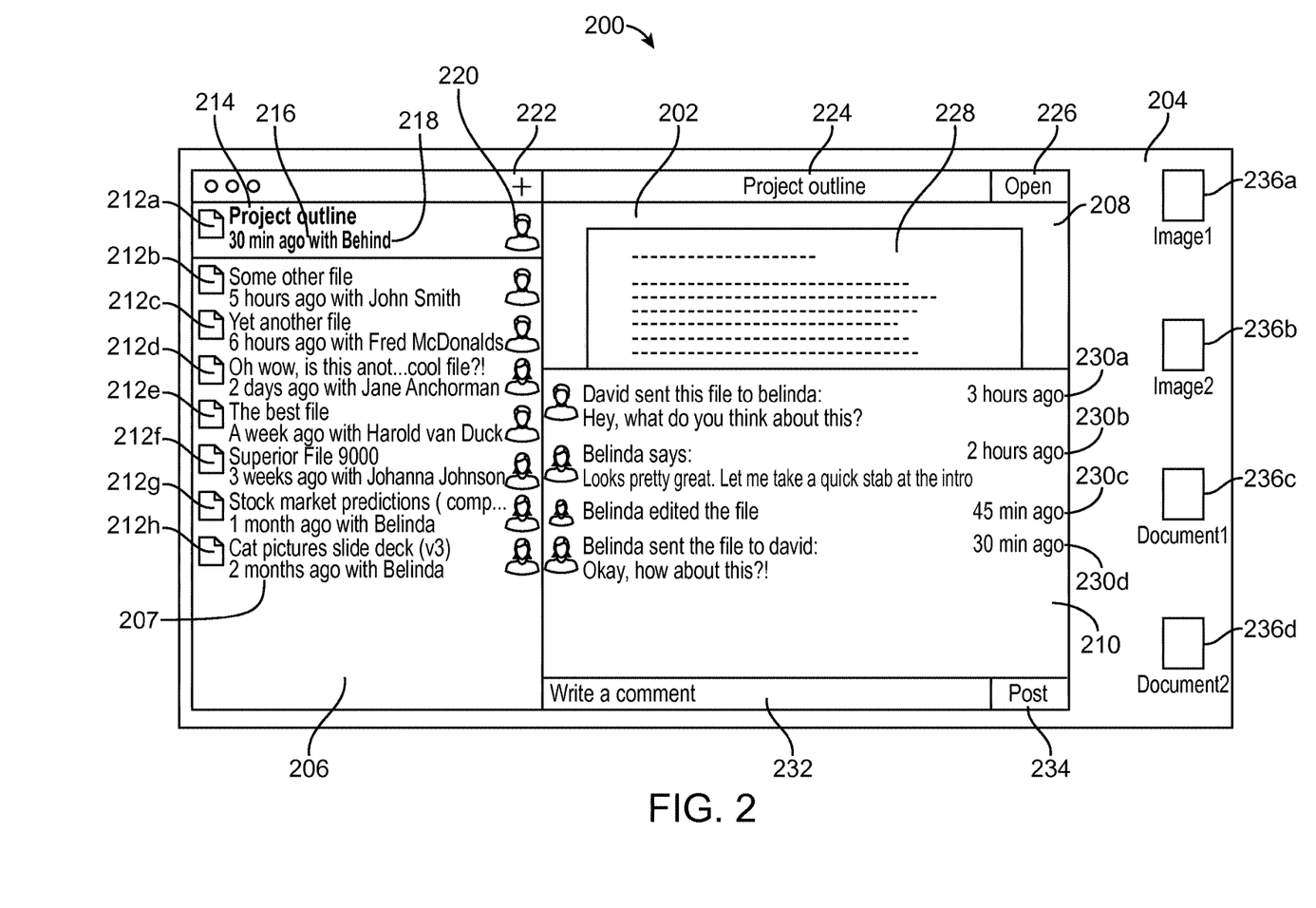
FIG. 2 is an exemplary user interface (UI) including a file sharing graphical user interface (GUI) rendering a shared file listing in accordance with an exemplary embodiment.

Referring to FIG. 2, an exemplary user interface (UI) having a file sharing graphical user interface (GUI) rendering a shared file listing in accordance with an exemplary embodiment is illustrated. As shown, the UI 200 can include a rendering of a file sharing graphical user interface (GUI) 202 having the shared file listing 207 of a user and a partial view of a desktop 204 of a client device 102. The file sharing GUI 202 can include a file sharing listing section 206, an image section 208 and a comment section 210. Alternative embodiments can include more or less sections and can be arranged differently.

As shown, the file sharing listing section 206 shows a list of files, e.g., a file sharing listing 207, of shared files that are associated with a user account. The file sharing listing 207 can include different types of file sharing listings 207, such as files that the user has shared with others (e.g., a sent box), files that others have shared with the user (e.g., an inbox) or a combination of both (e.g., an everything box). The user associated with the account can change the type of file sharing listing 207 as known in the art. The default file sharing list can be the everything box. As shown, the file sharing list 207 includes eight files 212a-212h in the user account with "Project outline" 212a being the most recent shared file and Cat pictures slide deck (v3) 212h being the oldest shared file in this view.

Each shared file can include information associated with the shared file. For example, the information can include the title of the shared file 214, a time indication of when the shared file was shared 216, the person (or account) who the file was shared with 218 and a sharer icon 220. As shown, the time indication 216 indicates how recently the file was shared. Alternatively, the time indications 216 can be in a different format. For example, the time indication can be the day, date and time the file was shared, such as "Friday 8/18/2015 2:30 PM." The sharer icon 220 can be an image of the non-account owner (e.g., the user who the account owner either shared a file with or the user who shared the file with the account owner), an image associated with the non-account owner, any other graphical display representing the non-account owner or no non-account owner icon. The shared files can include functions similar to email applications. For example, unread messages can include an indication of whether the shared file has been viewed, such as bolding, and a highlighted file indicates a selected file. Using menu options (not shown), the shared files can be arranged in accordance with different times, by sender, files that the user has shared with others (e.g., a sent box), files that others have shared with the user (e.g., an inbox) or a combination of both (e.g., an everything box), etc. Other indications can include an indication that the non-account owner has viewed the shared file, commented on the shared file or edited a shared file.

Figure 3:
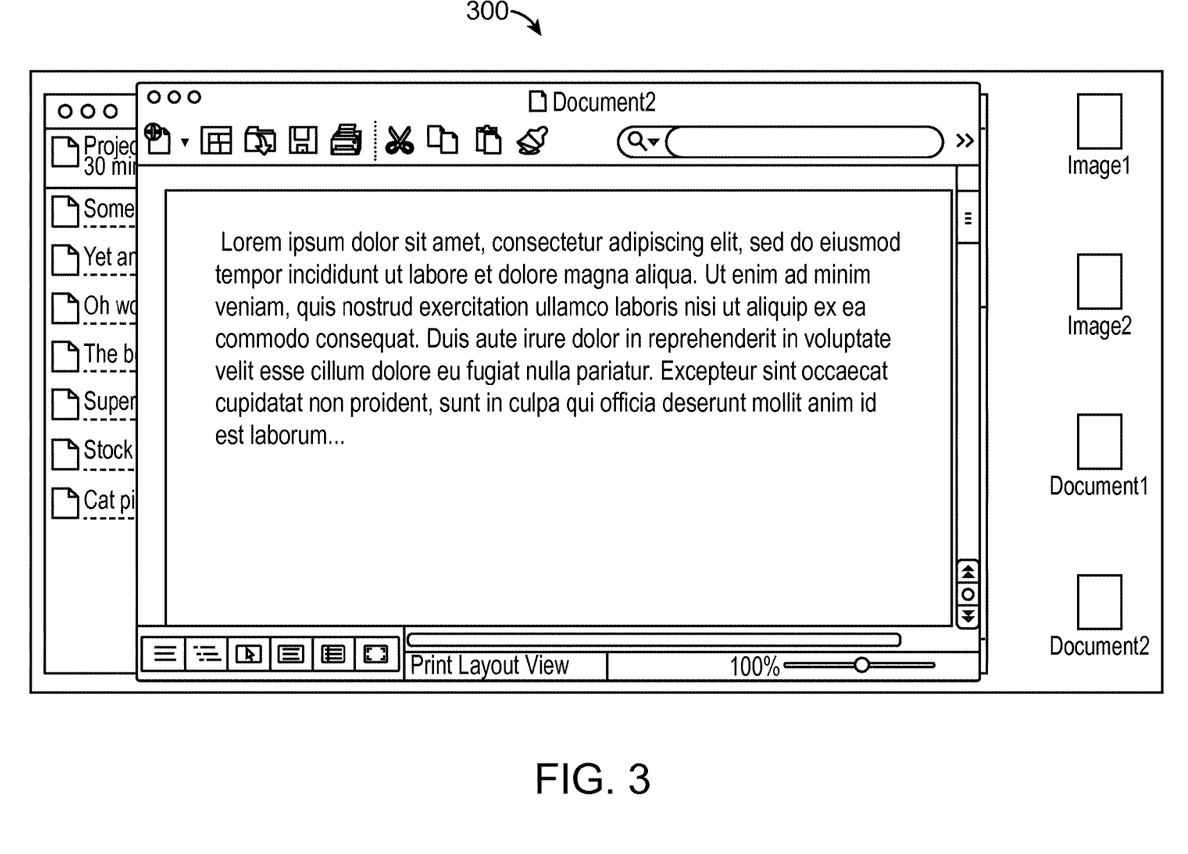
FIG. 3 is an exemplary UI having a selected file being rendered over the file sharing GUI in accordance with an exemplary embodiment.

The image section 208 can include an image of a selected file. For example, as shown, a partial image of the "Project outline" document is rendered. By clicking on the image or clicking on a button 226, e.g., "Open" button, the shared file can be opened and can be shown in a window on top of the file sharing GUI 206. The shared file can be opened using an associated application or native application. For example, a Word® file would be opened in Word® by Microsoft Corporation of Redmond, Wash. FIG. 3 is an exemplary UI having a selected file being rendered over the file sharing GUI 202 in accordance with an exemplary embodiment. The user can edit and save the selected file as known in the art.

Referring to FIG. 2 again, the comment section 210 displays comments 224 associated with the shared file. As shown, there are four displayed comments 224a-224d. Each comment 224 can include information identifying who commented on the shared file and with whom, the comment, a commenter icon, and a time indication associated with the comment. For example, the first comment 224a was sent by David (the account owner) to Belinda (the user who David shared the file with). The comment is, "Hey, what do you think about this?" The comment was sent 3 hours ago. The commenter icon can be an icon associated with the user who entered the comment. Each commenter icon can be an image associated with a contact, such a photo or an image associated with a contact. One or more comments can be displayed when a user interacts with the shared file. The interactions can include when a user has acted on a shared file and when the action took place. For example, "Belinda edited the file" forty-five minutes ago.

The comment section 210 can include a comment box 232 to write comments and a button 234 to send the comment, e.g., a "Post" button. In response to the button 234 being selected, the comment is associated with the file and the file sharing listing 207 of the person who the file is shared with can render the file as an unread file. For example, if a user, e.g., Belinda, commented on the "Project outline" file 212a, the comment would show up in David's shared file listing 207 as an unread message. If the file is selected or is the default file in David's shared file listing, the comments associated with the file would be rendered in the comment section 210.

To share a file, a user can select a file. For example, a user can select a displayed file and drag the selected file, such as one of the files 236a-236d displayed on the desktop 204 as shown in FIG. 2 and/or as explained below. In response to the user selecting and dragging a file, the file listing section 208 as shown in FIG. 2 is replaced with a contact section 402 shown in FIG. 4. After selecting the file, the user can drag the file into the contact section 402 and either releases the selected file on a contact icon or releases the file in an email section 406, such as a "By email" section in the contact section 402. For example, the user drags the file into the contact section 402 and can either release the selected file 230a on one of the contact icons 404 or can release the selected file 230a in the "By email" section 406. By placing the selected file on a contact icon 404, the file is sent to the selected contact. By placing the selected file in the email section 406, the user can enter an email address for the contact who the user wishes to send the selected file to and enters a send command. The contact section 402 can include a rendering of one or more contacts. For example, each contact can be represented by a contact icon 404. As shown the contact section 402 has six contact icons 404: Bob 404a, Pete 404b, Michael 404c, Jane 404d, Sarah 404e and Michelle 404f. Each contact icon 404 can be an image associated with a contact, such as a photo or an image associated with a contact. Alternatively, each contact icon 404 can be the name of a contact, e.g., Bob Smith.

Figure 4:
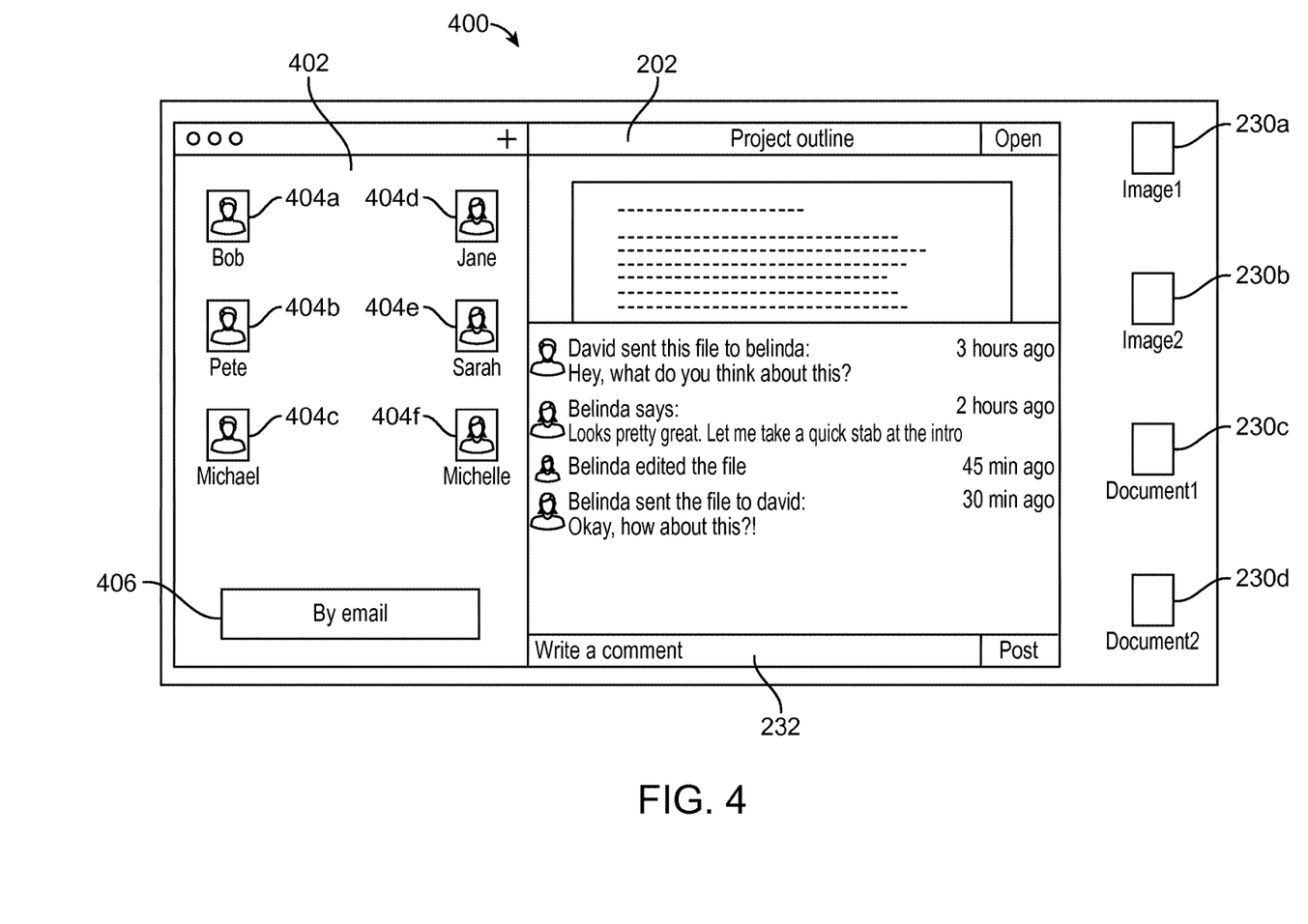
FIG. 4 is an exemplary UI having a file sharing GUI rendering a contact section in accordance with an exemplary embodiment.

The rendered contact icons 404 in the contact section 402 can be based on one or more algorithms known to one of ordinary skill in the art. For example, the rendered contacts icons 404 can be a number of contacts whom the user shared files with most recently, a number of contacts whom the user shared the most files with or any other known way to list contacts. The number of contacts can be a predetermined number and/or can be device dependent. In one or more embodiments, the user can scroll through a list of contacts icon 404 by holding the selected file below the email section 306 or using other known ways to scroll a list of contacts. The list of contacts can be imported from one or more contact lists, such as email contacts, address book contacts, social media contacts or any other list of contacts as known in the art.

Figure 5:
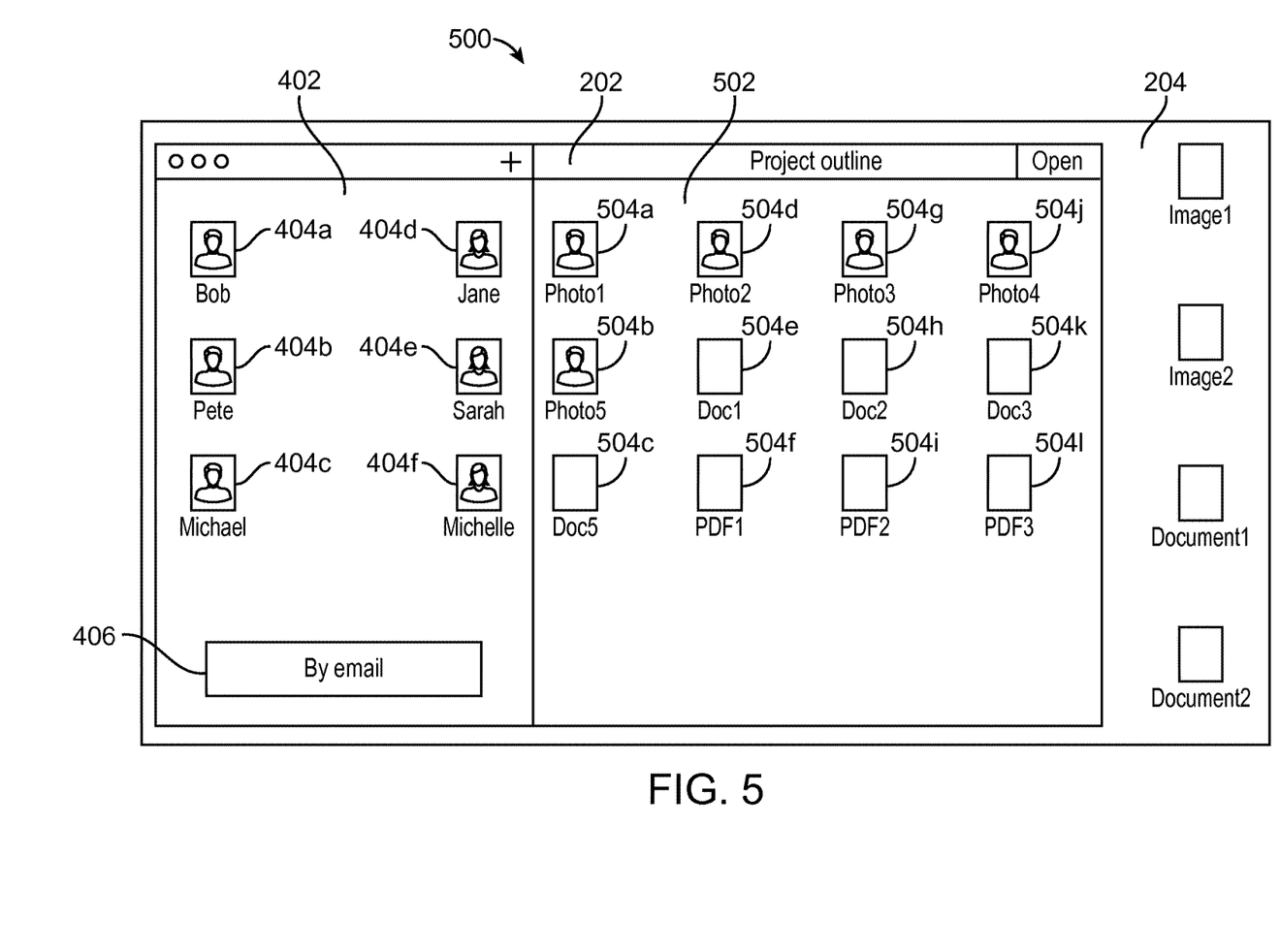
FIG. 5 is an exemplary UI for selecting a file to be shared and to select a contact to share a file with in accordance with an exemplary embodiment.

Referring to FIG. 2 again, the file sharing GUI 202 can include a file sharing icon 222, e.g., a plus sign ("+"), for selecting a file to be shared and to select a contact to share the selected file with. For example, FIG. 5 is an exemplary UI for selecting a file to be shared and selecting a contact to share a file with in accordance with an exemplary embodiment. As shown, the file sharing GUI 202 includes a contact section 402 and a listing of files section 502. The contact section 402 is discussed above with respect to FIG. 4. The file listing section 502 can display one or more file icons 504 of a number of files associated with the user. The number of files can be a predetermined number and/or can be device dependent. The displayed file icons 504 in the file listing section 502 can be based on one or more algorithms known to one of ordinary skill in the art. For example, the displayed file icons can be a predetermined number of files that the user has recently saved most recently. In one or more embodiments, the user can scroll through the listed files as known in the art. Alternatively, the file listing section 502 can be a list of files as known in the art. For example, the list of files can be a list of files as shown in File Explorer® by Microsoft Corporation of Redmond, Wash. In one or more embodiments, the list of files can be shown in the associated application or native application. The file listing can be imported from one or more file listings, such as from a file manager, my documents, a server, or any other file listings as known in the art. Alternatively, the file listing section 502 can be a default file listing, such as, from a file manager, my documents, a server, a content storage system or any other file listings known in the art.

To send a file, a user can select the file. For example, in FIG. 5, a user can select the photo 1 icon 504*a*. After selecting the file, the user drags the file into the contact section 402 and either releases the selected file on a contact icon 404 or releases the file in an email section 406, such as a "By email" section in the contact section 402. For example, the user drags the file into the contact section 402 and can either release the selected file 504*a* on one of the contact icons 404 or can release the selected file 504*a* in the "By email" section 406 as discussed above with respect to FIG. 4.

Example User Experience

Figure 6A:
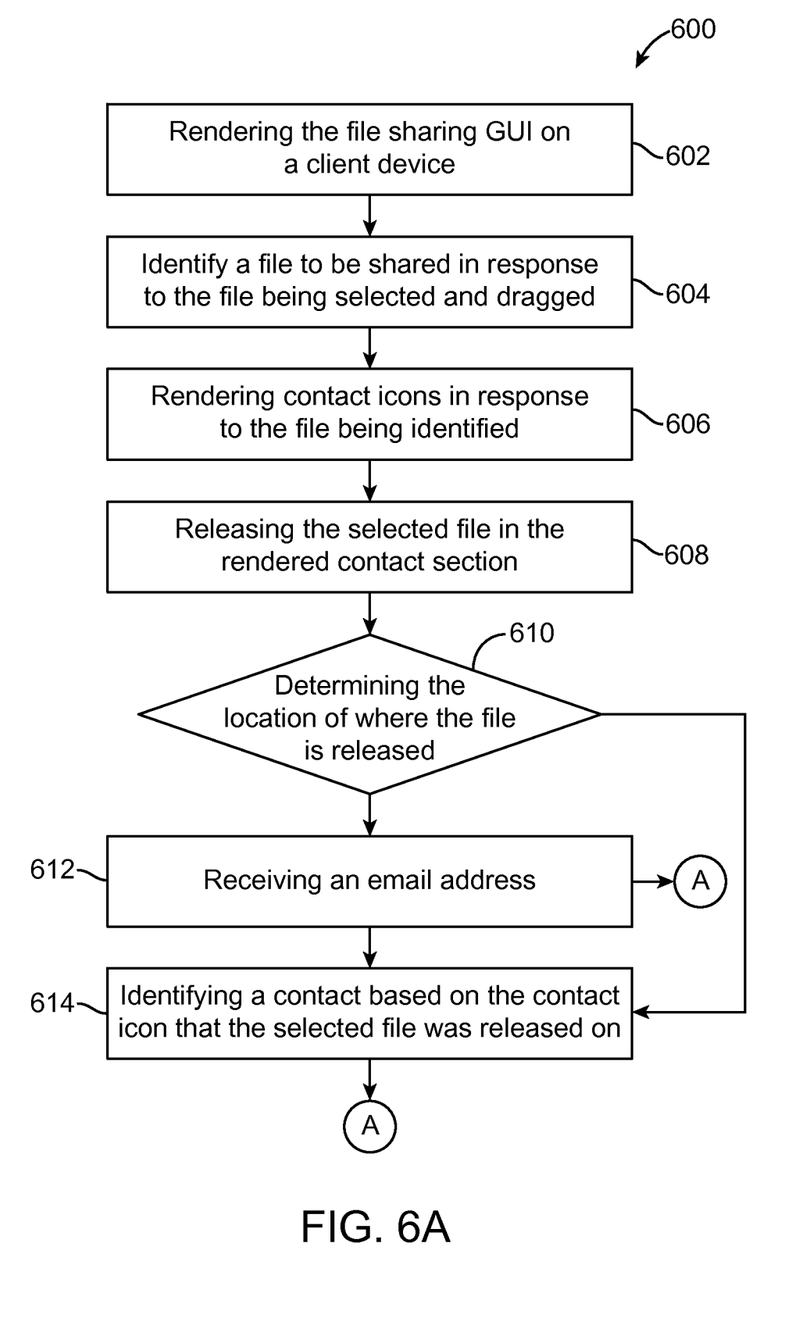
FIGS. 6A-6C are a flow diagram for sharing a file in accordance with an exemplary embodiment.
Figure 6B:
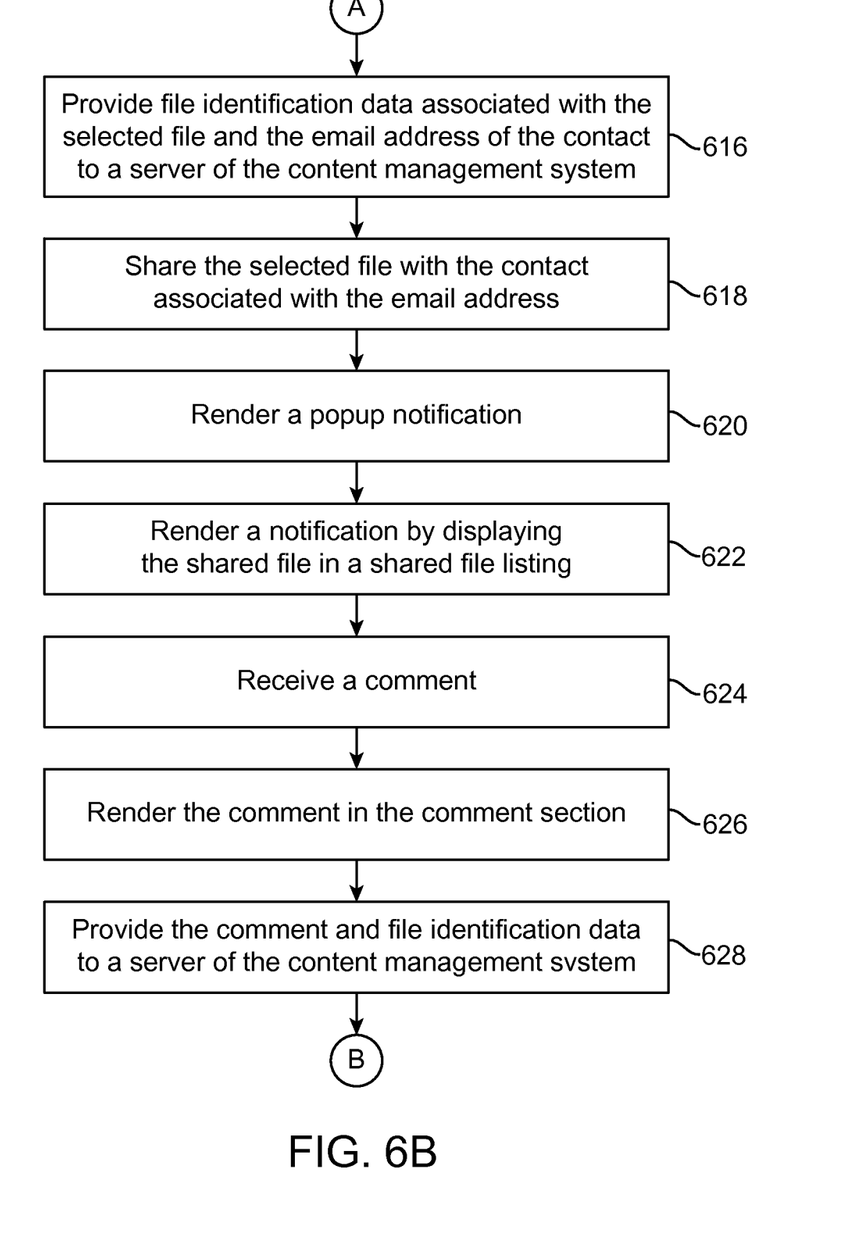
Figure 6C:
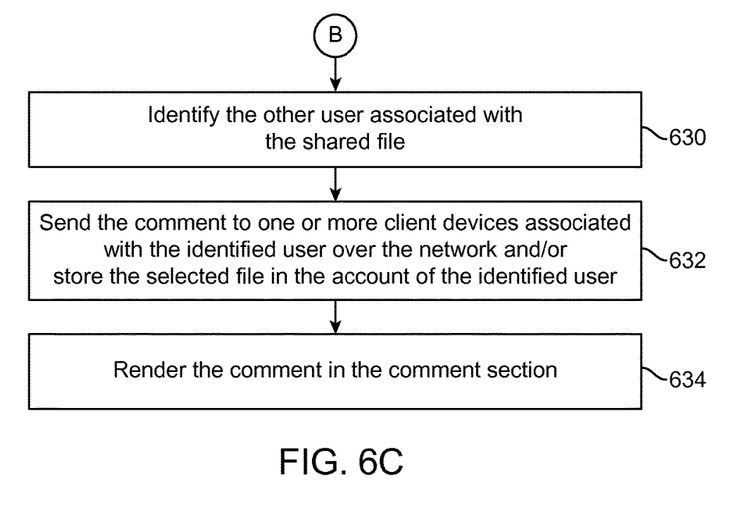

Referring to FIGS. 6A-6C, a flow diagram for sharing a file in accordance with an exemplary embodiment is illustrated. The exemplary method 600 is provided by way of example, as there are a variety of ways to carry out the method. The method 600 described below can be carried out using the configurations illustrated in FIG. 1 by way of example, and various elements of this figure are referenced in explaining exemplary method 600. Each block shown in FIG. 6 represents one or more processes, methods or subroutines, carried out in the exemplary method 600. The exemplary method 600 is described with respect to an application operating on a client device 102. However, one of ordinary skill in the art would recognize that the method 600 can be performed via a browser on a client device 102 as known in the art. The exemplary method 600 can begin at block 602.

At block 602, the file sharing GUI is rendered on a client device. For example, a processor in the client device 102$_i$ can cause the rendering of the file sharing GUI as shown in FIG. 2 when a first user accesses his or her user account in the content management system. After the file sharing GUI is rendered on the client device 102$_i$, the method 600 can proceed to block 604.

At block 604, a file to be shared is identified in response to the file being selected and dragged. For example, the processor in the client device 102 identifies a file to be shared in a one-on-one collaboration in response to the first user selecting the file and dragging the file. The file selection can be selected as described above. For example, a user can select a file icon displayed on the desktop 204 as shown in FIG. 2 or by selecting a file from a displayed application. In another example, a user can select the file sharing icon 222 as shown in FIG. 2 and then selecting a file from the file listing section 502 as shown in FIG. 5. After identifying the file to be shared, the method 600 can proceed to block 606.

At block 606, contact icons are rendered in response to the file being identified. For example, a processor in the client device 102$_i$ can cause the rendering of the contact icons 404 in the contact section 402 in the file sharing GUI 202 as shown in FIG. 4 or shown in FIG. 5, depending on how the file was selected, and the selected file being dragged. After rendering a list of contacts, the method 600 can proceed to block 608.

At block 608, the selected file is released in the contact section 402. For example, the user can drag the selected file and release the selected file in the contact section 402 shown in FIG. 4 or FIG. 5. After the selected file is dragged into the contact section 402, the method proceeds to block 610.

At block 610, the location of where the file is released is determined. For example, the processor of the client device 102$_i$ determines whether the selected file was released on a contact icon 404 or in the email section 406. In the event, the selected file was released on the email section 406, the method 600 proceeds to block 612. In the event, the selected file was released on a contact icon 404, the method 600 proceeds to block 614.

At block 612, an email address is received. For example, the processor of the client device 102 receives an email address that was entered in the email section 406 and a send command was entered. After receiving an email address, the method 600 proceeds to block 616.

At block 614, an email address associated with the contact icon where the selected file was released is identified. For example, the processor of the client device 102 identifies a contact based on the contact icon 404 that the selected file was released on and associates an email address with the selected contact icon 404. The identified contact can be a user identifier associated with a user and/or one or more accounts. After identifying the email address, the method 600 proceeds to block 616.

At block 616, file identification data associated with the selected file and the email address of the contact is provided to a server of the content management system. For example, the processor of the client device 102$_i$ provides the file identification data and the email address of the contact to a server and/or the file sharing module 130 of the content management system 106 over the network 104. The file identification data can include the file and/or the location of where the file is stored in the content storage 160 of the content management system 106. Alternatively, the information can include one or more accounts associated with the contact. After providing the file identification data and contact information, the method can proceed to block 616.

At block 618, the selected file is shared with the contact associated with the email address. For example, a server and/or the UI module 122 of the content management system 106 can send (e.g., synchronize) the selected file to one or more client devices 102$_j$ associated with the email address via the network 104. The selected file or the location of the selected file can be stored in each of the accounts associated with the selected file. Alternatively, the selected file can be shared with one or more email addresses associated with the contact/account. After the selected file is shared with the identified contact, the method 600 can proceed to block 620.

At block 620, a popup notification is rendered. For example, in response to the selected file being shared with the contact, the processor of the client device 102$_j$ can cause the rendering of a popup message on the client device 102$_j$. An exemplary popup notification can be, "Bob sent you Bar.doc." After rendering the notification, the method 600 can proceed to block 622.

At block 622, a notification is rendered by displaying the shared file in a shared file listing. For example, the processor of the client device 102 can cause the rendering of the shared file in the shared file listing 207 in the file sharing listing section 206 on the client device 102 associated with the identified email address. The shared file can include a notification that the file has been unread, e.g., displayed in bold. After rendering the notification, the method 600 can proceed to block 624.

At block 624, a comment can be received. For example, the processor of the client device 102$_i$ of the person who shared the file or the processor of the client device 102$_j$ of the person who received the shared file can receive a comment entered in the comment section 210 in response to the button 234, e.g., post button being selected. After receiving the comment, the method 600 can proceed to block 626.

At block 626, the comment is rendered in the comment section. For example, the processor of the client device 102$_i$, 102$_j$ in which the comment was entered can cause the rendering of the entered comment in the comment section 210 on the client device 102. After rendering the comment, the method 600 can proceed to block 628.

At block 628, the comment and file identification data is provided to a server of the content management system. For example, the processor of the client device 102$_i$, 102, in which the comment was entered can send the comment and the file identification data to a server and/or the file sharing module 130 of the content management system via the network 104. After providing the comment to the server, the method 600 can proceed to block 630.

At block 630, the other user associated with the shared file is identified. For example, a server and/or the file sharing module 130 of the content management system 106 can identify the other user associated with the shared file. The other user can be identified based on the file identification data. After associating the comment with the file, the method 600 can proceed to block 632.

At block 632, the comment is sent to one or more client device associated with the identified user and/or the selected file is stored in the account of the identified user in the content storage 160. For example, a server and/or the file sharing module 130 sends, via the network 104, the comment to the client device 102$_i$, 102$_j$ associated with the identified contact along with file information identifying the file the comment is to be associated with. After providing the comment to the other user, the method can proceed to block 634.

At block 634, the comment is rendered in the file sharing GUI rendered on the client device 102. For example, the processor of the client device 102$_i$, 102$_j$ can cause the rendering of the comment in the comment section in the rendered file sharing GUI on the client device 102$_i$, 102$_j$ associated with the other user. For example, FIG. 2 shows displayed comments. The processor can also display the file at the top of the file listing as an unread file.

Figure 7:
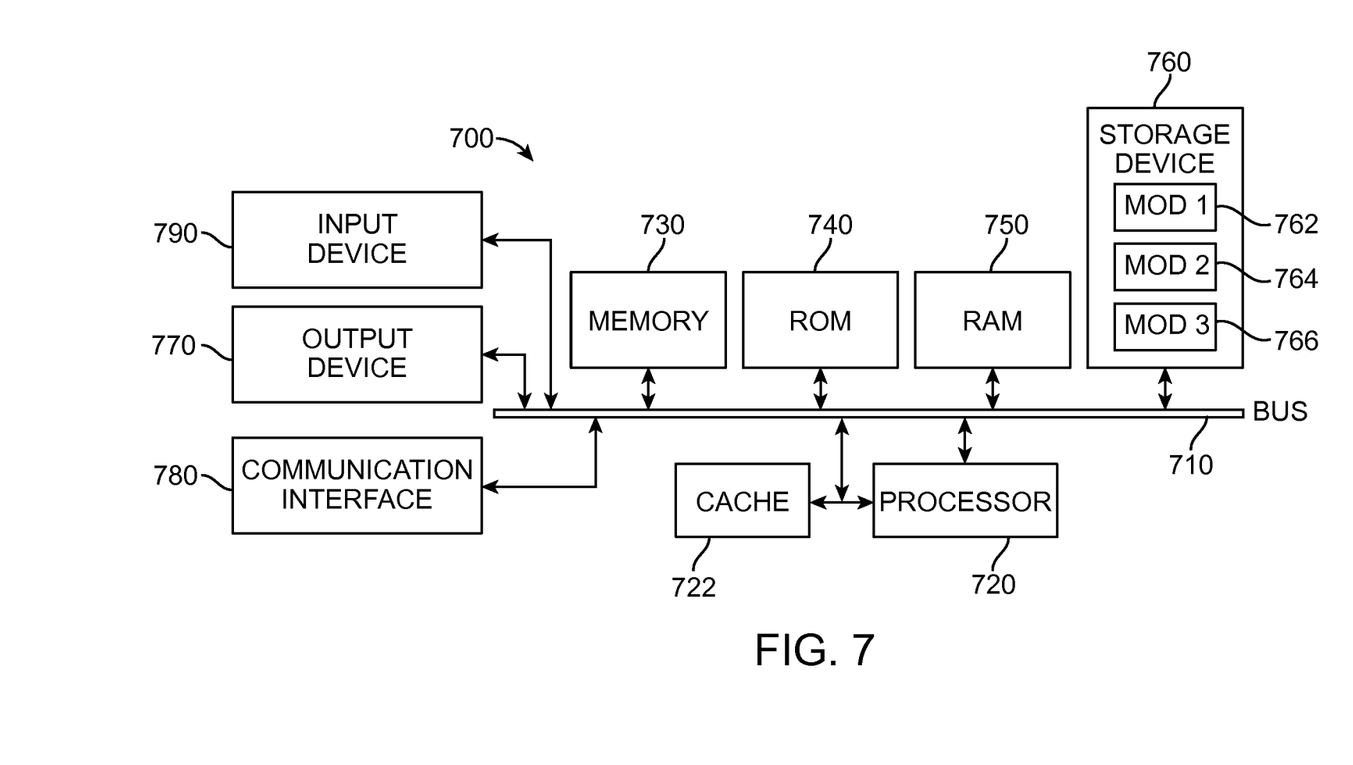
FIG. 7 is a schematic diagram of a client device in accordance with an exemplary embodiment.

Referring to FIG. 7, a schematic diagram of a client device 102 in accordance with an exemplary embodiment is illustrated. As shown, the client device 102 700 can include a processing unit (CPU or processor) 720 and a system bus 710 that couples various system components including the system memory 730, such as read only memory (ROM) 740 and random access memory (RAM) 750, to the processor 720. The client device 102 700 can include a cache 722 of high-speed memory coupled with, in close proximity to, or integrated as part of the processor 720. The client device 102 700 copies data from the memory 730 and/or the storage device 760 to the cache 722 for quick access by the processor 720. In this way, the cache provides a performance boost that avoids processor 720 delays while waiting for data. These and other modules can control or be configured to control the processor 720 to perform various operations or actions. Other system memory 730 may be available for use as well. The memory 730 can include multiple different types of memory with different performance characteristics. It can be appreciated that the disclosure may operate on a client device 102 700 with more than one processor 720 or on a group or cluster of client device 102s networked together to provide greater processing capability. The processor 720 can include any general purpose processor and a hardware module or software module, such as module 1 762, module 2 764, and module 3 766 stored in storage device 760, configured to control the processor 720 as well as a special-purpose processor where software instructions are incorporated into the processor. The processor 720 may be a self-contained computing system, containing multiple cores or processors, a bus, memory controller, cache, etc. A multi-core processor may be symmetric or asymmetric. The processor 720 can include multiple processors, such as a system having multiple, physically separate processors in different sockets, or a system having multiple processor cores on a single physical chip. Similarly, the processor 720 can include multiple distributed processors located in multiple separate client device 102s, but working together such as via a communications network. Multiple processors or processor cores can share resources such as memory 730 or the cache 722, or can operate using independent resources. The processor 720 can include one or more of a state machine, an application specific integrated circuit (ASIC), or a programmable gate array (PGA) including a field PGA.

The system bus 710 may be any of several types of bus structures including a memory bus or memory controller, a peripheral bus, and a local bus using any of a variety of bus architectures. A basic input/output (BIOS) stored in ROM 740 or the like, may provide the basic routine that helps to transfer information between elements within the client device 102 700, such as during start-up. The client device 102 700 further includes storage devices 760 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 760 can include software modules 762, 764, 766 for controlling the processor 720. The system 700 can include other hardware or software modules. The storage device 760 is connected to the system bus 710 by a drive interface. The drives and the associated computer-readable storage devices provide nonvolatile storage of computer-readable instructions, data structures, program modules and other data for the client device 102 700. In one aspect, a hardware module that performs a particular function includes the software component stored in a tangible computer-readable storage device in connection with the necessary hardware components, such as the processor 720, bus 710, display 770, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 700 is a small, handheld client device 102, a desktop computer, or a computer server. When the processor 720 executes instructions to perform "operations", the processor 720 can perform the operations directly and/or facilitate, direct, or cooperate with another device or component to perform the operations.

Although the exemplary embodiment(s) described herein employs the hard disk 760, other types of computer-readable storage devices which can store data that are accessible by a computer, such as magnetic cassettes, flash memory cards, digital versatile disks (DVDs), cartridges, random access memories (RAMs) 750, read only memory (ROM) 740, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the client device 102 700, an input device 790 represents any number of input mechanisms, such as a microphone for speech, a touch-sensitive screen for gesture or graphical input, keyboard, mouse, motion input, speech and so forth. An output device 770 can also be one or more of a number of output mechanisms known to those of skill in the art. In some instances, multimodal systems enable a user to provide multiple types of input to communicate with the client device 102 700. The communications interface 780 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 720. The functions these blocks represent may be provided through the use of either shared or dedicated hardware, including, but not limited to, hardware capable of executing software and hardware, such as a processor 720, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 740 for storing software performing the operations described below, and random access memory (RAM) 750 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 700 shown in FIG. 1 can practice all or part of the recited methods, can be a part of the recited systems, and/or can operate according to instructions in the recited tangible computer-readable storage devices. Such logical operations can be implemented as modules configured to control the processor 720 to perform particular functions according to the programming of the module. For example, FIG. 1 illustrates three modules Mod1 762, Mod2 764 and Mod3 766 which are modules configured to control the processor 720. These modules may be stored on the storage device 760 and loaded into RAM 750 or memory 730 at runtime or may be stored in other computer-readable memory locations.

One or more parts of the exemplary client device 102 700, up to and including the entire client device 102 700, can be virtualized. For example, a virtual processor can be a software object that executes according to a particular instruction set, even when a physical processor of the same type as the virtual processor is unavailable. A virtualization layer or a virtual "host" can enable virtualized components of one or more different client device 102s or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 720 can include all types of processors disclosed herein, including a virtual processor. However, when referring to a virtual processor, the processor 720 includes the software components associated with executing the virtual processor in a virtualization layer and underlying hardware necessary to execute the virtualization layer. The system 700 can include a physical or virtual processor 720 that receive instructions stored in a computer-readable storage device, which cause the processor 720 to perform certain operations. When referring to a virtual processor 720, the system also includes the underlying physical hardware executing the virtual processor 720.

CONCLUSION

In light of the above, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
  receiving, at a server of a content management system from a first client device associated with a user having an account with the content management system:
    file identification data for a file to be shared; and
    a user identifier for a single contact with whom to share the file, wherein the single contact is selected by the user from within a contact section of a file sharing graphical user interface in response to detecting that the user releases a file icon associated with the file to be shared on a contact icon associated with the single contact, wherein the contact section of the file sharing graphical user interface is rendered on the first client device to replace another section of the file sharing graphical user interface in response to the user selecting and dragging the file icon associated with the file to be shared in the another section; and
  providing, by the server of the content management system, the file to the single contact in response to detecting that the user releases the file icon associated with the file to be shared on the contact icon associated with the single contact.

2. The method of claim 1, further comprising causing the rendering of the contact section of the file sharing graphical user interface in response to the user selecting and dragging the file icon associated with the file to be shared.

3. The method of claim 2, further comprising causing the contact section of the file sharing graphical user interface to replace the another section of the file sharing graphical user interface in response to the user selecting and dragging the file icon associated with the file to be shared.

4. The method of claim 2, wherein receiving the user identifier for the single contact with whom to share the file comprises:
  detecting that the user releases the file icon associated with the file to be shared on an email icon within the file sharing graphical user interface; and
  receiving user input of an email address associated with the single contact.

5. The method of claim 1, further comprising determining file identification data associated with the file in response to detecting the user selecting and dragging the file icon.

6. The method of claim 5, further comprising storing the file in an account associated with the single contact in response to detecting that the user releases the file icon associated with the filed to be shared on the contact icon associated with the single contact.

7. The method of claim 1, further comprising:
  receiving, by the server of the content management system, a comment entered in a comment section rendered within a file sharing graphical user interface on a second client device, wherein the comment corresponds to the file to be shared; and
  storing, by the server of the content management, the comment in the account associated with the user.

8. The method of claim 7, further comprising causing a presentation of the comment in a comment section of the file sharing graphical user interface rendered on the first client device.

9. The method of claim 1, wherein the contact section of the file sharing graphical user interface comprises a plurality of contact icons associated with contacts of the user.

10. The method of claim 9, wherein the plurality of contact icons comprises contact icons associated with contacts with whom the user has shared files most recently.

11. A method comprising:
  rendering, by a processor of a first device, a file sharing graphical user interface on the first device, the first device communicatively coupled to a server of a content management system and associated with a user having an account with the content management system;

detecting, by the processor of the first device, a click and drag of a file icon displayed in a first section of the file sharing graphical user interface associated with a file to be shared with a contact of the user;

rendering, in response to the click and drag of the file icon, a contact section of the file sharing graphical user interface rendered on the first device to replace the first section of the file sharing graphical user interface;

determining, by the processor of the first device, that the file icon is released within the contact section on a contact icon corresponding to the contact of the user; and in response to determining that the file icon is released on the contact icon, providing a user identifier associated with the contact corresponding to the contact icon to the server of the content management system over a network to cause the content management system to share a file corresponding to the file icon with the contact of the user.

12. The method of claim 11, further comprising determining file identification data associated with the file in response to detecting the click and drag of the file icon.

13. The method of claim 12, wherein causing the content management system to share the file corresponding to the file icon with the contact of the user comprises causing the content management system to store the file in an account associated with the contact of the user.

14. The method of claim 12, wherein causing the content management system to share the file corresponding to the file icon with the contact of the user comprises causing the content management system to:

provide the file to a second device associated with the contact of the user; and provide a notification of sharing the file to the second device.

15. The method of claim 14, wherein providing the notification comprises causing the second device to display the selected file in a shared file listing in a file sharing listing section of a file sharing graphical user interface displayed on the second client device.

16. The method of claim 14, further comprising detecting a click and drag of a second file icon associated with a second file to be shared with the contact of the user.

17. The method of claim 16, further comprising:

detecting that the user releases the second file icon on an email icon within the file sharing graphical user interface; and receiving, based on detecting that the user releases the second file icon on the email icon, an email address associated with the contact of the user.

18. The method of claim 11, wherein the contact section comprises a plurality of contact icons associated with contacts of the user.

19. The method of claim 18, wherein the plurality of contact icons comprises contact icons associated with contacts with whom the user has shared files most recently.

20. The method of claim 11, further comprising:

receiving, by the processor of the first device, a comment entered in a comment section of the file sharing graphical user interface, wherein the comment corresponds to the file; and providing, by the processor of the first device, the comment to the server of the content management system.

21. The method of claim 11, further comprising:

detecting that the user holds the file icon at a bottom portion of the contact section of the file sharing graphical user interface; and scrolling through contact icons within the contact section in response to detecting that the user holds the file icon at the bottom portion of the contact section.

* * * * *